United States Patent
Blumrich et al.

(10) Patent No.: US 11,108,704 B2
(45) Date of Patent: Aug. 31, 2021

(54) USE OF STASHING BUFFERS TO IMPROVE THE EFFICIENCY OF CROSSBAR SWITCHES

(71) Applicant: NVIDIA Corp., Santa Clara, CA (US)

(72) Inventors: Matthias Augustin Blumrich, Ridgefield, CT (US); Nan Jiang, Acton, MO (US); Larry Robert Dennison, Santa Clara, CA (US)

(73) Assignee: NVIDIA Corp., Santa Clara, CA (US)

( * ) Notice: Subject to any disclaimer, the term of this patent is extended or adjusted under 35 U.S.C. 154(b) by 46 days.

(21) Appl. No.: 16/703,697

(22) Filed: Dec. 4, 2019

(65) Prior Publication Data

US 2020/0177521 A1    Jun. 4, 2020

Related U.S. Application Data

(60) Provisional application No. 62/775,213, filed on Dec. 4, 2018.

(51) Int. Cl.
| | |
|---|---|
| *H04L 29/08* | (2006.01) |
| *H04L 12/933* | (2013.01) |
| *H04L 12/935* | (2013.01) |
| *H04L 12/861* | (2013.01) |
| *H04L 12/937* | (2013.01) |
| *H04L 12/931* | (2013.01) |

(52) U.S. Cl.
CPC .......... *H04L 49/101* (2013.01); *H04L 49/254* (2013.01); *H04L 49/3036* (2013.01); *H04L 49/70* (2013.01); *H04L 49/9047* (2013.01)

(58) Field of Classification Search
None
See application file for complete search history.

(56) References Cited

U.S. PATENT DOCUMENTS

| | | | |
|---|---|---|---|
| 2003/0088694 A1* | 5/2003 | Patek ..................... | H04L 49/25 709/238 |
| 2005/0083921 A1* | 4/2005 | McDermott, III .... | H04L 49/357 370/360 |
| 2013/0028083 A1* | 1/2013 | Yoshida .................. | H04L 49/60 370/230 |
| 2014/0321471 A1* | 10/2014 | Lau ...................... | H04L 49/3027 370/401 |
| 2014/0351239 A1* | 11/2014 | Davis ................ | G06F 16/24553 707/718 |
| 2020/0053002 A1* | 2/2020 | Heidelberger ........ | H04L 49/101 |
| 2020/0344143 A1* | 10/2020 | K .......................... | H04L 43/062 |
| 2020/0412835 A1* | 12/2020 | Xu ........................ | H04L 67/327 |

* cited by examiner

Primary Examiner — Brandon M Renner
(74) Attorney, Agent, or Firm — Rowan TELS LLC

(57) ABSTRACT

A switch architecture enables ports to stash packets in unused buffers on other ports, exploiting excess internal bandwidth that may exist, for example, in a tiled switch. This architecture leverages unused port buffer memory to improve features such as congestion handling and error recovery.

9 Claims, 6 Drawing Sheets

| Link Type | Length | % of Ports | Port Buffers Underutilized |
|---|---|---|---|
| Endpoint | <1m | 25 | 99% |
| Intra-Group | <5m | 50 | 95% |
| Inter-Group | <100m | 25 | 0% |

USE OF STASHING BUFFERS TO IMPROVE THE EFFICIENCY OF CROSSBAR SWITCHES

CROSS-REFERENCE TO RELATED APPLICATIONS

This application claims priority and benefit of U.S. provisional application Ser. No. 62/775,213, filed on Dec. 4, 2018, titled "USE OF STASHING BUFFERS TO IMPROVE THE PERFORMANCE OF CROSSBAR SWITCHES", the contents of which are incorporated herein by reference in their entirety.

GOVERNMENT LICENSE RIGHTS

This invention was made with US Government support under Agreement H98230-16-3-0001 awarded by the Department of Defense. The US Government has certain rights in this invention.

BACKGROUND

A general-purpose switch for a high-performance network is typically designed with symmetric porting, credit-based flow control, and error recovery via packet retransmission. The ports of a symmetrically ported switch are all configured with the same amount of buffer memory, where "buffer memory" in this context refers to memory for storing and forwarding data packets.

Modern network topologies utilize a wide range of link lengths. When such topologies are constructed with switches that have symmetric porting this results in a significant over-provisioning of buffer memory, particularly in edge switches, resulting in an inefficient use of resources.

In some cases, a single switch may provide both symmetric porting for certain sets of ports, and asymmetric porting for other sets of ports. A switch with asymmetric porting is one with ports configured with differing amounts of buffer memory. In asymmetrically ported switches each port buffer memory is sized based on the longest data path (link) to or from the port.

The use of asymmetric network links may lead to asymmetric resource requirements for the port buffer memories in a switch. Asymmetric network links are external data paths (e.g., cables) of different physical lengths to and from a network switch. When asymmetric links are used, the amount of buffering required by each port to implement packet retransmission (output buffering) and credit-based flow control (input buffering) may be directly proportional to the link length to the port.

FIG. 1 depicts link asymmetries 100 and summarizes the connectivity of switch ports and the corresponding port buffer memory requirements for a large-scale dragonfly network. Herein, "dragonfly network" refers to a hierarchical network with three levels: switch, group, and system. A dragonfly network is described for example in the paper entitled "Technology-Driven, Highly-Scalable Dragonfly Topology", by Kim et. al, published in Proceedings of the 35th Annual International Symposium on Computer Architecture.

As depicted in FIG. 1, a typical dragonfly network is constructed with short links connecting endpoint devices to switches, somewhat longer links between switches within each group, and even longer links between groups of switches. Assuming the dragonfly network is constructed with symmetrically ported switches that have port buffer memories sized for the longest links, approximately 72% of the overall port buffer memory capacity of each switch may not be required for typical packet retransmission. This over-provisioning of port buffer memories is due to the asymmetry of the link lengths coupled to the symmetric porting.

In the example depicted in FIG. 1, 25% of the switch ports may be connected to endpoints that are 1 meter (m) or less away, using 1 m cables. Intra-group links may account for 50% of the ports and may connect to cables that are 5 m long. The final 25% of the ports may be used to make inter-group links using up to 100 m cables. The 25% of ports used for endpoint links may only use 1% of their allocated buffer memory, leaving 99% of the port buffers underutilized. The 50% of ports used for intra-group links may underutilize 95% of their buffer memory. Only the inter-group ports may use all of the buffer memory allocated to them. Thus approximately 72% of the overall port buffer capacity of each switch may not be needed for typical input and output buffering. This extra memory may instead be used to implement the packet stashing functionality disclosed herein.

Cable length is the limiting parameter for buffer utilization. While an intra-group link may be made to a device that is closer to the switch than 5 m, if a 5 m cable is used, the signal must travel the entire length of the cable. Typically, an acknowledgement may be expected, which may also take some expected amount of time to travel back along the cable, based on the cable length. The time it takes for data to be transmitted from source to destination, and for the packet received acknowledgment to return from destination to source, is the round-trip latency.

Port buffer memory may be used to preserve data transmitted so that the data may be resent if a packet received acknowledgment is not received, or a packet failure is indicated. Because the round-trip latency for data is longer across a 100 m cable than across a 1 m cable, more data may be sent during the time elapsed on the 100 m cable. Thus more buffer memory may be needed for ports using longer cables. However a switch manufacturer may not know what length of cable will be connected to a given port in the field. Therefore, switches may be designed with the assumption that all ports will be connected to the longest supported cable length. Ports linked with shorter cables may for this reason be allocated much more memory than they actually need.

BRIEF SUMMARY

A stashing architecture for tiled switches enables global access to unused port buffer memory by utilizing available internal switch bandwidth. Fully-accessible stash partitions are formed from unused port buffer memory by intelligent partitioning of the switch input buffers and switch output buffers.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Certain terminology is used in the following description and should be understood as follows. A data path is any path followed by a communication packet. A data path can traverse a network and/or the internals of a switch. Herein the use of "packet" should be understood to mean whatever unit of data is used for communication in a network. It should also be understood that sub-packet constructs such as datagrams and flits, and multi-packet constructs may be utilized in place of packets.

A port buffer is a buffer memory within a switch port used to store packets arriving to or departing from ports. An input port refers to an interface between a network data path and a switch for the purpose of receiving data into the switch and an output port refers to an interface between a switch and a network data path for the purpose of sending data out of the switch. An input buffer is a port buffer used with an input port, and an output buffer is a port buffer used with an output port. Packets collect in an input buffer while waiting their turn to travel through the internal switching fabric. Packets collect in an output buffer while waiting their turn to be communicated via an output port.

A crossbar refers to a type of switching fabric comprising a collection of switching elements arranged in a matrix configuration. A crossbar has multiple input data paths and multiple output data paths that form a crossed pattern of interconnecting data paths between which a connection may be established by closing a switching element (e.g., a transistor) located at each intersection. Each intersection point may thus be thought of as an element of the matrix. A row bus is a bus linking an input port to multiple switching elements leading to output ports in a crossbar, and a column bus is a bus linking multiple row buses (via switching elements) to an output port.

A crossbar switch is a network switch utilizing at least one crossbar. A tiled switch is a crossbar switch utilizing a plurality of crossbar tiles, where a crossbar tile refers to a sub-crossbar within a larger crossbar matrix. A crossbar tile is coupled to a subset of the input ports of the network switch and switches this subset of input ports to a subset of the output ports of the network switch.

A virtual channel is a type of communication channel using control data and dedicated buffers that are separate from those of other channels sharing the same physical communication medium (e.g., the same physical bus or cable). For example, multiple virtual channels may be formed over the same row bus and/or column bus in a crossbar switch. In a crossbar switch virtual channels may be implemented, for example, by time multiplexing packets onto the physical buses. Virtual channels could also be implemented, for example, using frequency multiplexing but this is less common in switches.

Figure 1:
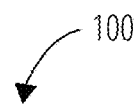
FIG. 1 depicts an example of link asymmetries 100.
Figure 2:
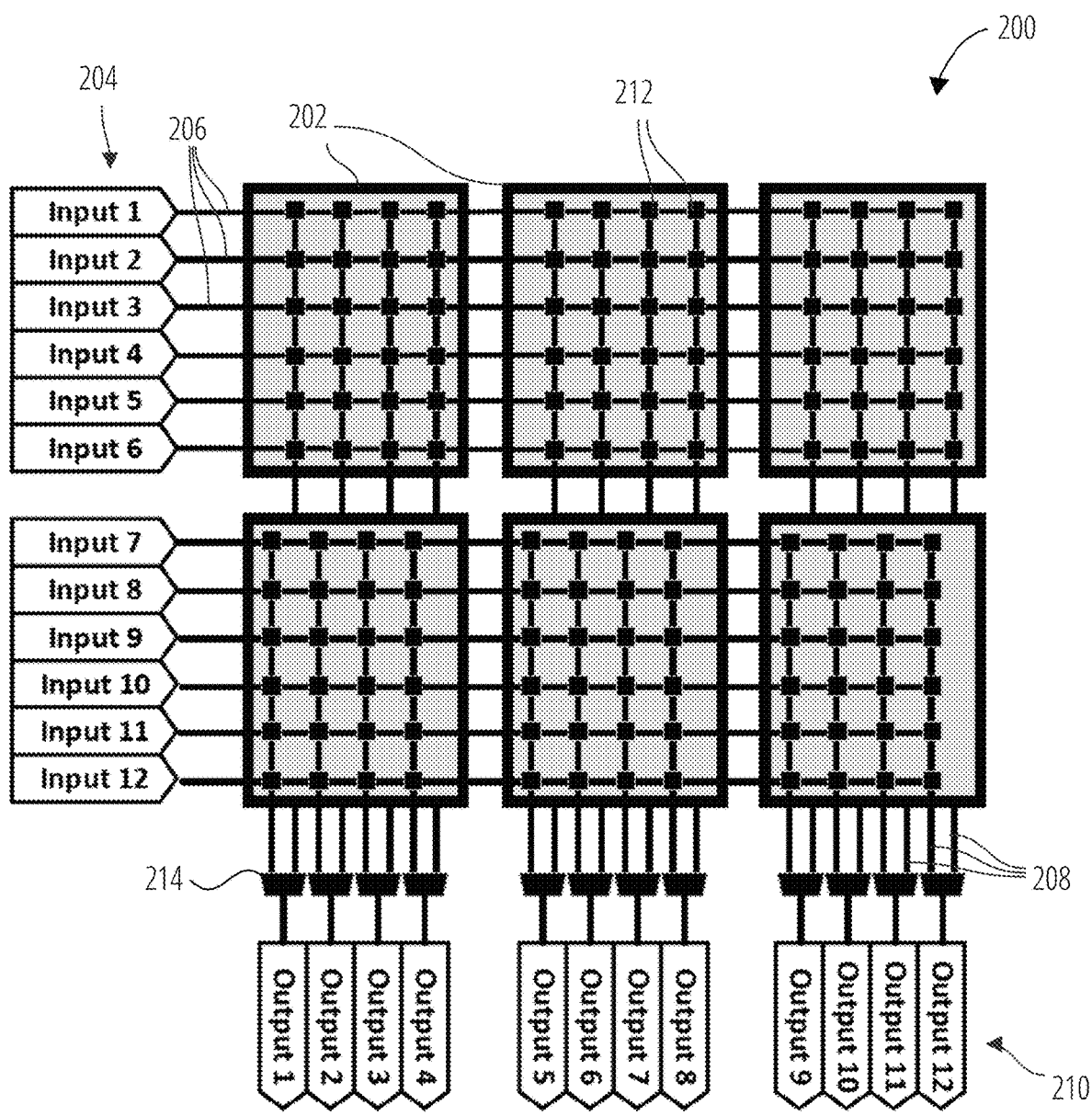
FIG. 2 depicts an example of a conventional tiled crossbar switch 200.

FIG. 2 depicts the basic architecture of a tiled switch with radix P, where the radix is the number of bidirectional switch ports, and each switch port has an input port and an output port. It comprises a two-dimensional array of identical crossbar tiles, with R rows and C columns, forming a larger crossbar that may couple any one of the P input ports to any one of the P output ports. Each of the crossbar tiles 202 comprises I inputs and O outputs forming a smaller I×O crossbar that functions as a sub-portion of the overall crossbar and may couple any one of its I inputs to any one of its O outputs. Each of the crossbar tiles 202 additionally comprises I×O switching elements 212 (only two of many are numbered), each of which may couple one tile input to one tile output. In general, a valid crossbar tile arrangement satisfies:

$$P = I \times R \qquad \text{Equation 1}$$

$$P = C \times O \qquad \text{Equation 2}$$

Each row of crossbar tiles is supplied by I switch input ports, and each switch input port is coupled to all C tiles in a row of the crossbar via a row bus. For example, the tiled crossbar switch 200 comprises twelve row buses, each coupled to three of the crossbar tiles. The outputs from the R crossbar tiles in each column are point-to-point connections that are each connected to a column bus. Column buses from each row of crossbar tiles in the same column are merged to one of the output ports using an R-to-1 multiplexer. In FIG. 2, each switch output port is supplied by two crossbar tiles—one per row—thus utilizing 2-to-1 multiplexers for each column bus merge.

The tiled crossbar switch 200 is an example with six crossbar tiles 202 arranged in two rows and three columns. Each individual crossbar tile may be connected to six out of twelve switch input ports 204 and four out of twelve switch output ports 210. Input 1 through Input 6 connect to the first row of crossbar tiles. Input 7 through Input 12 connect to the second row of crossbar tiles. Outputs 1 through 4, 5 through 8, and 9 through 12 connect to the first, second, and third columns of crossbar tiles 202, respectively.

Each switch input may connect to the three crossbar tiles in its associated row over a multi-drop row bus. Herein, "multi-drop" refers to the ability of a bus to transfer data to any subset of connected receivers simultaneously. For example, a single row bus 206 may be coupled to one or more switching elements 212 within one or more crossbar tiles 202 simultaneously. The output from each crossbar tile 202 in each column is coupled to a point-to-point column bus 208, and within each column, the column buses from each row are merged via a multiplexer 214 (only one of many is numbered) into a point-to-point connection to one of the switch output ports 210. Therefore, each multiplexer selectively couples one of the column buses in its column to the switch output for at least the duration of a packet transfer. Appropriately timed switching of packets from a row bus 206 (of which three of many are numbered) to column buses 208 (of which three of many are numbered) and operation of the multiplexers enables creation of dynamic channels for the transfer of packets from each input port to one or more output ports.

Across the entire tiled crossbar switch 200, the total number of column buses from the crossbar tiles to the output multiplexers is R×C×O. From Equation 2, this means that the column bus bandwidth of the internal crossbar is R times higher than the switch radix P. This excess internal bandwidth together with the multi-drop behavior of each row bus enables the stashing of packets with minimal impact on switch performance.

The tiled crossbar switch 200 depicted is merely an example, and various radixes, tile sizes and tile arrangements may be designed depending on engineering trade-offs such as clock frequency, port capacity, the availability of wiring tracks, and tile complexity.

Figure 3:
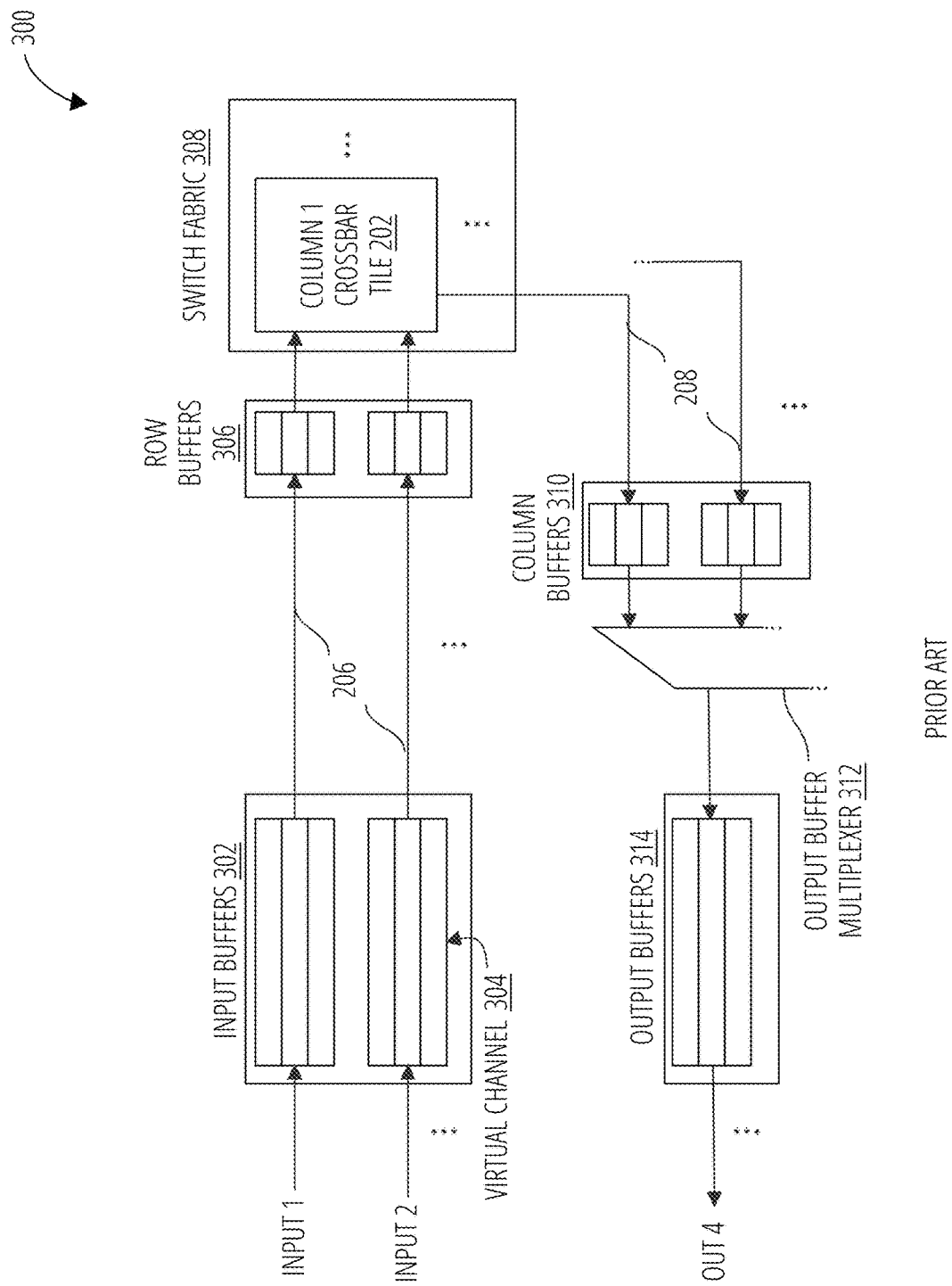
FIG. 3 depicts an example of data paths in a conventional crossbar switch 300.

FIG. 3 is a simplified depiction of a conventional crossbar switch 300 and a data path from one switch input port to one switch output port. In addition to crossbar switch elements introduced previously in FIG. 2, the crossbar switch 300 as depicted comprises input buffers 302, row buffers 306, a switch fabric 308, column buffers 310, output buffer multiplexer 312, and output buffers 314. A conventional crossbar switch typically includes many other components known in the art but omitted from FIG. 3 as unnecessary to the present disclosure.

Buffer memory is utilized by the crossbar switch 300 to enable the internal routing of packets through the switch in two independent steps: (1) input port to crossbar tile, and (2) crossbar tile to output port. Packets received by the switch may be stored in the input buffers 302, and the virtual channels 304 (VCs) of the input buffers 302 may compete for access to the row bus 206. The winner may advance a packet to a corresponding one of the row buffers 306. A row buffer is a store-and-forward memory area for packets output from input buffers to a row bus in a crossbar switch. The row buffers 306 may compete for access to a crossbar tile column bus 208. The column buffers 310 are packet buffers on the column bus between (1) a crossbar tile output, and (2) an output port.

Packets advance on column buses 208 to their corresponding one of the virtual channel column buffers 310 and the column buffers 310 compete for use of the output buffers 314. The output buffers 314 compete for access to the switch output ports 210.

A packet arriving at the crossbar switch 300 on the input port named Input 1 is buffered in the input buffers 302 to wait its turn on the corresponding row bus 206. Virtual channels are configured on the row bus 206 which each include a corresponding one of the row buffers 306. In the depicted embodiment, there are three virtual channels 304 configured on each row bus 206. Virtual channels may enable the switch to avoid deadlock by buffering data from multiple sources, then sending data from multiple buffers over the physical bus at effectively the same time, by interleaving smaller increments of data from separate, buffered packets (a form of time-multiplexed transmission). Thus one data source sending a large amount of data may be prevented from completely blocking the switch from servicing other data sources for a period of time. Virtual channels may also increase throughput and reduce latency.

A packet received at Input 1 may travel from a virtual channel 304 of the input buffers 302 along a row bus 206 to one of the row buffers 306 and then to the crossbar tile 202. The crossbar tile 202 may switch the packet to one of the column buses configured for the output port named Out 4. The packet on the column bus may be buffered in one of the column buffers 310 at the input of the output buffer multiplexer 312. Packets from the two column buses supplying Out 4 (e.g., one column bus from each of the two crossbar tiles depicted as supplying Out 4 in FIG. 2) are selectively switched to the output buffers 314 for output port Out 4 by the output buffer multiplexer 312. The packets may be stored in the output buffers 314 in an ordered fashion before being transmitted via the output port Out 4.

The input buffers 302 and output buffers 314 provide flow control and reliable transmission between switches. The input buffers 302 enable lossless, credit-based flow control, and the output buffers 314 enable packet retransmission. Herein "credit-based flow control" refers to a communication technique in which a sender receives credits from a receiver for a certain amount of data the sender is allowed to transmit to the receiver without overflowing the receiver's buffers. At various times, the receiver sends credits to the sender indicating availability of buffer space at the receiver for receiving data. After having received credits for a certain amount of data, the sender is eligible to forward that data to the receiver. Each time the sender forwards data to the receiver, it decreases its current credit balance by the amount sent. Packet retransmission, referred to above, involves the resending of a packet to a receiver by a sender, usually because a packet received acknowledgment from the receiver was not received by the sender in a configured interval of time. A packet received acknowledgment is a return signal sent by a receiver to a sender of a packet, confirming receipt of the packet.

Copies of packets are stored in the output buffers 314 until a positive packet received acknowledgment is returned from the receiving switch indicating that the transmission was successful. Both the input buffers 302 and output buffers 314 are sized for roughly one link round-trip latency time worth of data. The round-trip latency is the time it takes to traverse a communication link to and from the switch in both directions. The product of the round-trip latency and the link bandwidth determines the sizes of the input buffers 302 and output buffers 314 used in a conventional switch.

Figure 4:
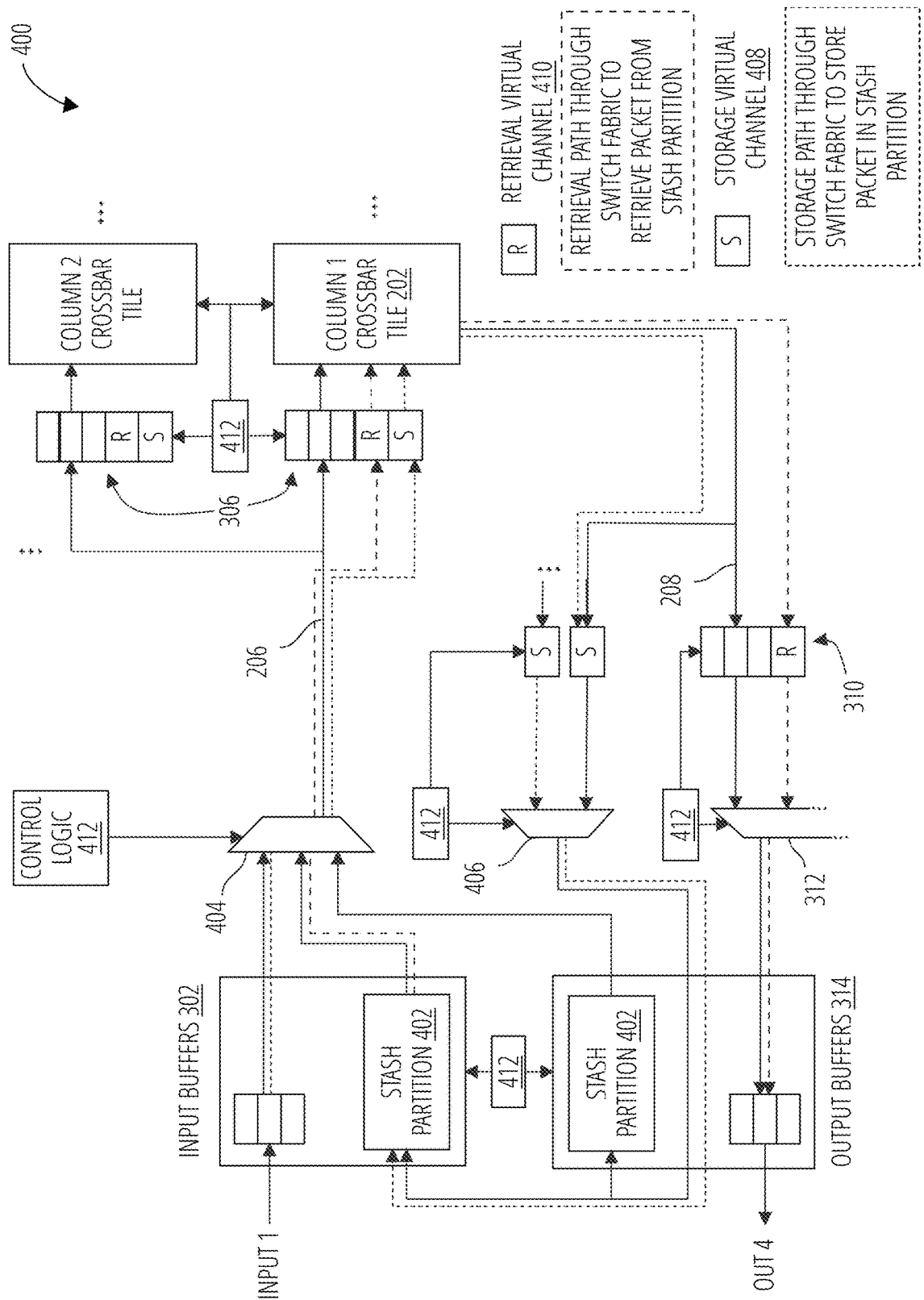
FIG. 4 depicts an example of data paths in a crossbar switch 400 in accordance with one embodiment.

An improved crossbar switch 400 is depicted in FIG. 4, which shows a single input port to output port data path through the switch to illustrate how the port buffers (input buffers 302 and output buffers 314) are utilized for stashing. The embodiment depicted in FIG. 4 comprises some elements of conventional crossbar switch designs depicted previously. Additional components not depicted are typically present and additional data paths are typically implemented, as known in the art.

To leverage unused internal crossbar bandwidth, the crossbar switch 400 modifies conventional switch architectures that support the use of virtual channels. The components of the crossbar switch 400 are coordinated using control logic 412. The operation of the control logic 412 will be evident from the description of operation of the crossbar switch 400 to follow.

A virtual stash partition (stash partition 402—an area of an input buffer and/or output buffer used for stashing packets) is formed from memory of both the input buffers 302 and the output buffers 314. The stash partition 402 is referred to as being a "virtual partition" because it may span physical memory partitions (such as different memory chips on different port buffers) while presenting a contiguous address space to the control logic 412. The stash partition 402 may be formed from separate physical memory areas, but along with other stash partitions, it may be managed as a single "stash storage pool", one or more stash partitions configured as a pooled stash memory resource.

The stash retrieval multiplexer 404 and the stash storage multiplexer 406 are added to access the separate read ports and write ports of the stash partition 402. In addition to the conventional virtual channels, additional virtual channels 304 are added to the data path: one for storage (storage virtual channel 408, depicted by a dotted line and "S") and one for retrieval (retrieval virtual channel 410, depicted by a dashed line and "R"). References to virtual channels will be understood to include not only the data path but also any associated row and column buffer storage on the data path. The storage virtual channel 408 is a virtual channel on a data path to a memory used to store packets. The retrieval virtual channel 410 is a virtual channel on a data path to retrieve stored packets. These virtual channels are internal to the crossbar switch 400 and not visible to applications external to the crossbar switch 400.

Packets to be stashed are communicated from the input buffers 302 to the storage virtual channel 408 where they may be stored in the row buffers 306. Packets to be stashed may in one embodiment arbitrate for the crossbar tile at the same priority as other virtual channels. Storage virtual channel packets stored in the row buffers 306 may be duplicates of packets written simultaneously, or time multiplexed, to the conventional virtual channel buffers. At the output port, packets in storage virtual channel buffers from all column buses arbitrate through a stash storage multiplexer 406 for writing into the stash storage pool.

For example, a data packet arriving on Input 1 may be identified for storage in the stash partition 402. Packets from Input 1 to Out 4 that are not identified for stashing may follow the conventional data path depicted in FIG. 3. However, when identified for storage in the stash partition 402, the data packet may travel along the data paths indicated by the dotted lines through the storage virtual channel 408. The packet in the storage virtual channel 408 passes through a stash storage multiplexer 406 and is stored in the stash partition 402, instead of passing through the output buffer multiplexer 312 for transmission by the output port. Note that while the stash partition 402 may be provisioned using both of input and output buffer memory, it may be treated as a single memory block (e.g., a unified address space, part of the stash storage pool), with packets stashed in either portion shown, depending on where space is available. In addition, FIG. 4 depicts the stash partition 402 formed from the buffers of input 1 and output 4, but these operations are generally applicable to the stash partitions of all other ports.

Packets retrieved from the stash partition 402 arbitrate for the row bus 206 alongside packets from the conventional virtual channels 304 of the input buffers 302 but use the retrieval virtual channel 410. The retrieval virtual channel 410 may have equal priority with the other virtual channels in the crossbar. Packets read from the stash partition 402 and other packets from the same input port share the row bus 206 into the crossbar tiles, causing potential bandwidth contention.

There are several ways of addressing the additional bandwidth demand on the row bus 206, such as adding a duplicate row bus per input port, the duplicate row bus dedicated to carrying packets from the stash partition 402. Another approach is to increase the operating speed of the crossbar tile to provide additional row bus bandwidth, a technique known as "overclocking". Overclocking is a common technique for enhancing switch performance at the cost of some additional power consumption and engineering effort.

When a packet in a stash partition 402 is identified for retrieval, to be sent to an output port, it follows the data path indicated by the dashed line through the retrieval virtual channel 410 along the row bus 206 and column bus 208. The packet may be retrieved from the stash partition 402 through the stash retrieval multiplexer 404 and travel over the row bus 206 on the retrieval virtual channel 410 to be stored in the row buffers 306. It may then travel down the appropriate column bus 208 on the retrieval virtual channel 410 to the column buffers 310. From there, it may travel through the output buffer multiplexer 312 for output port Out 4. The use of separate retrieval and storage virtual channels helps prevent the switch from experiencing deadlock.

At the input of the output buffer multiplexer 312, packets retrieved from the stash partition 402 are stored in a distinct retrieval virtual channel buffer alongside the conventional virtual channel buffers of the column buffers 310 supplying the switch output port. Subsequent to passing the output buffer multiplexer 312 the retrieved packets return to their original virtual channel.

While the use of these data paths is described sequentially for simplicity, in practice, packets may be flowing along all the illustrated paths concurrently, as well as along the numerous analogous paths to and from switch input ports and switch output ports not depicted. A packet being sent to the stash partition 402 may be transmitted through any crossbar tile to reach the stash partition 402; it is not limited to the data path followed by a duplicate packet intended for transmission on the network. In addition, these enhancements may be implemented for use with any switch fabric and are not limited to the tiled crossbar configuration illustrated in FIG. 4. Any design that includes excess port buffer memory may be used to implement the solution disclosed herein. Some embodiments may incorporate a separate switching fabric dedicated to storage and retrieval to and from the stash partition 402, as described herein with reference to FIG. 6.

A tiled switch may thus be implemented with stash partitions and a packet recirculating data path through the tiled switch, wherein the stash partitions are formed from unused port buffer memory and the packet recirculating data path traverses the tiles of the switch between the input ports and the output ports.

Various algorithms may be used to determine which port buffer stores a stashed packet (a packet stored in a stash partition). Unlike non-stashed packets which have assigned output ports, stashed packets may be directed to any port (input port or output port) that has available stash partition space.

In one embodiment a join-shortest-queue algorithm is utilized to adaptively select a path that will likely direct packets to a port buffer with the lowest utilized stash partition. Herein, "join-shortest-queue algorithm" refers to a routing technique in which an incoming request is routed to a resource (e.g., a column buffer in a crossbar switch) with the least number of unfinished requests. The algorithm strives to balance load across the switch resources, reducing the probability of a resource being oversubscribed while another is underutilized. For example, when a packet to be stashed is at the head of the input buffer queue 302, it is directed to the row buffer with the highest available storage virtual channel credits, where "head" refers to the first position in an ordered memory buffer. When a stashed packet is at the head of the storage virtual channel 408 queue of the row buffers 306, it is directed to the column buffer with the highest available storage virtual channel credits. Ports with no stashing buffers available (e.g., the global ports of a dragonfly network) are determined a priori and therefore the data paths to those ports may be omitted from the selection process via configuration.

Flow control for the storage and retrieval virtual channels may be implemented using credits, similar to non-stashing virtual channels. Depletion of credits on the stashing virtual channels results in backpressure that may affect the performance of the switch. Herein, "backpressure" refers to the buildup of packets in a switch when buffers are full and not able to receive additional data. For example, when storing packets in stash partitions, a packet cannot be sent unless there is available space in some stash partition. Therefore, transfer of packets from the input buffers 302 to a crossbar tile depends on the availability of a conventional virtual channel and the availability of the storage virtual channel 408. If the storage virtual channel 408 is backpressured the switch input stalls even if the conventional virtual channel is available. Backpressure may also occur with respect to the retrieval virtual channel 410.

Storage isolation is achieved by partitioning port buffer memory so that it may be utilized for both the normal (non-stashing) functionality and as a stash partition. A dual-ported memory with one read port and one write port is sufficient for normal operation, but stashing adds a second read port and a second write port along with the potential for all four ports to be active simultaneously. A dual-ported memory is a memory that allows two accesses to occur at the same time, or overlapping in time, unlike single-ported memory which allows only one access at a time.

Figure 5:
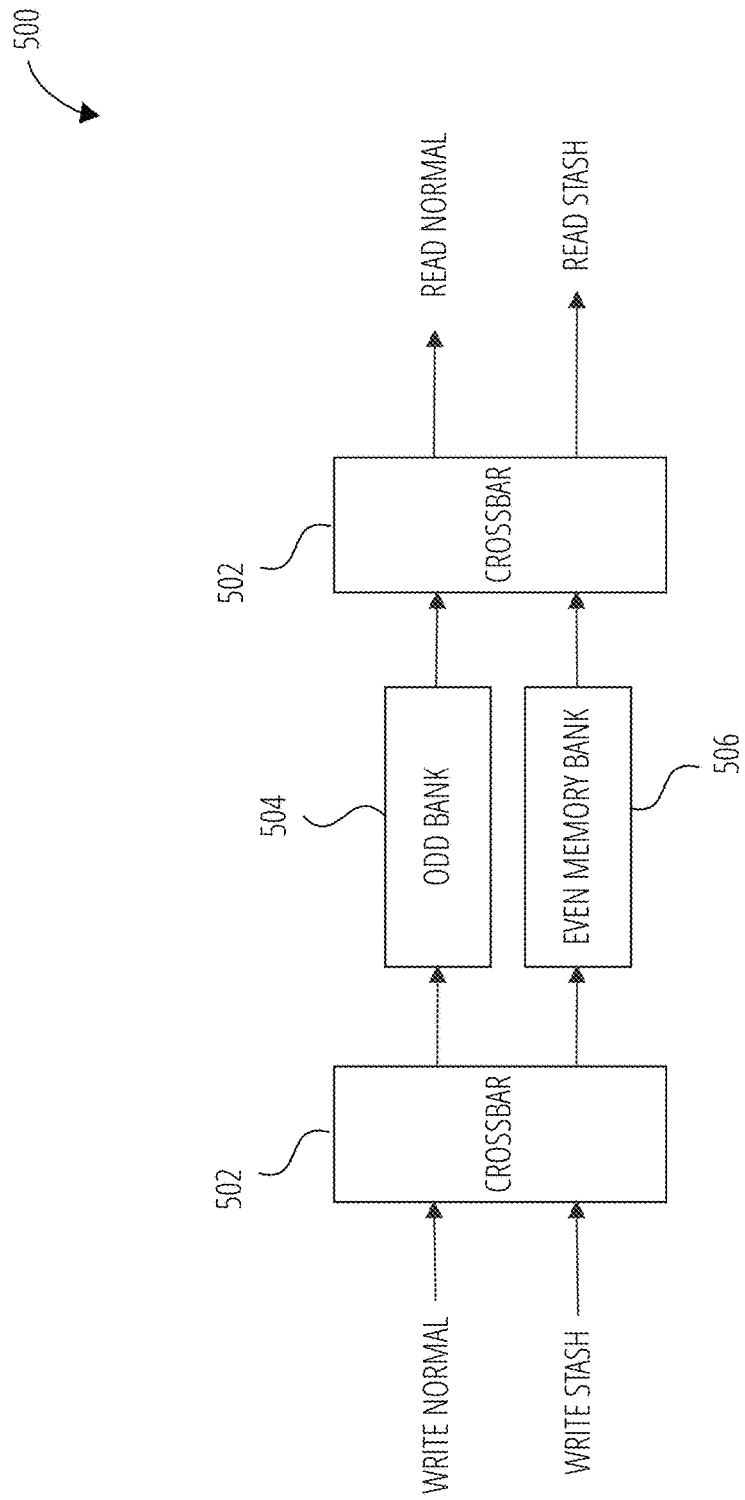
FIG. 5 depicts a four-port buffer 500 in accordance with one embodiment.

FIG. 5 depicts a four-port buffer memory 500 that may be utilized to implement port buffers in the unconventional crossbar switch 400. Using the four-port buffer memory 500 the port buffers may be divided into two memory banks each shared by the read ports and the write ports. The four-port buffer 500 comprises an odd memory bank 504 and an even bank 506 coupled via four ports to crossbars 502. Storage isolation involves partitioning buffer memory so that it may be used for both the conventional packet processing and for stashing.

A memory bank refers to a distinct set of storage locations in a memory. The memory bank boundaries may be determined by the memory controller along with physical organization of the memory hardware. A memory bank may be comprised of multiple rows and columns of storage units, spread out across several memory chips.

A dual-ported memory with one read port and one write port may be sufficient in conventional switches, but stashing may necessitate a second set of read and write ports, along with the potential for all four ports to be active simultaneously. Options to address this are the use of four-ported memory or dual-ported memory operating at twice the normal speed. However, the solution depicted in FIG. 5 is superior to these approaches in some respects. In FIG. 5 the memory is partitioned into two memory banks shared by the read and write ports. Each memory bank may store flits, one per cycle, with all even-numbered flits in one memory bank (the even bank 506) and odd-numbered flits in the other (the odd memory bank 504). Therefore, a multi-flit packet write or read operation may be interleaved between the two memory banks. The multiple interleaved memory bank method may enable the memory to be divided into two virtual partitions of any configured sizes at a two-flit granularity.

The term "flit" is short for 'flow control unit', a link-level atomic unit of a network packet or stream. The first flit of a packet, called the header flit, typically holds destination address information for the packet and sets up the routing behavior for all subsequent flits associated with the packet. The header flit is typically followed by zero or more body flits, containing the actual payload of data packet. The final flit, called the tail flit, typically performs some bookkeeping to close the connection used by the data packet.

There are different techniques for dealing with memory bank collisions between the read ports and between the write ports. Write sequences may simply avoid one another and include a state setting for the memory bank the sequence started on (one bit per packet), or write sequences may be processed two flits at a time and written in the order of availability of the write ports. Sequential read sequences may be started in a non-conflicting order.

The management of each individual stash partition involves three operations: storing, retrieving, and deleting. A general-purpose switch will typically utilize a large number of virtual channels for deadlock avoidance and multiple traffic classes. Deadlock is a situation in which two or more components in a network are each awaiting the other to complete an operation before performing their own operation.

A dynamically allocated multi-queue (DAMQ) algorithm in such switches allocates port buffer memory pages to virtual channels dynamically, according to demand, and manages them using a memory heap algorithm. The heap is an area of memory configured for dynamic allocations, meaning that memory pages may be allocated in the memory heap and freed in an arbitrary order and accessed multiple times (as contrasted for example with a memory stack, which is typically managed as last-in-first-out). Memory pages are fixed-length, contiguous block of memory addresses, usually defined by a single entry in a page table. Each virtual channel buffer memory is divided into fixed-size memory pages that are dynamically allocated to packets which are tracked for later retrieval and/or deletion. Because stash partitions have the same requirements, the memory heap management logic may partition the buffer memory into a DAMQ memory heap, and a stashing memory heap. Alternatively, the memory heap management logic may operate separately on the stash partitions.

The disclosed switching architecture may be utilized, for example, to implement network end-to-end retransmission and to improve Explicit Congestion Notification (ECN). "End-to-end retransmission" refers to the re-sending of a packet (including positive and negative acknowledgements) from a sender to a receiver over a network, and is a feature of many protocols used in large-scale networks including Transmission Control Protocol (TCP) and InfiniBand. ECN enables notification of network congestion between two endpoints without dropping packets. An example of ECN is an extension to the Internet Protocol and to the Transmission Control Protocol as defined in RFC 3168 (2001).

In one embodiment, stashing for end-to-end retransmission on a data path through a dragonfly network may be implemented only on the first-hop switch of the dragonfly network so that there are no correctness or deadlock issues, where "first hop switch" refers to the first switch on the data path. Injected packets arriving at first hop switches are stored in the stashing partitions for end-to-end retransmission (when necessary). The stash partition in such switches may be utilized to store a copy of these packets until packet received acknowledgments for the stashed packets are received from the last switches on the data paths. Packets arriving at switches other than the first hop in the data path do not implement end-to-end retransmission storage and are handled in the same manner as in a conventional tiled switch.

When the conventional data path and the stashing data path through the crossbar switch are both available, the input port communicates the packet to the row bus. If the stashing data path is blocked due to stash partitions throughout the switch being full, the switch input port may stall until stash partition space is freed by returning packet received acknowledgements. The multi-drop row bus communicates the packet to the conventional virtual channel buffer and the stashing virtual channel buffer of the row buffers simultaneously, regardless of which column each data path corresponds to. Thus, a copy of the packet to stash is created without consuming additional input port or row bus bandwidth. The stashing virtual channel buffer is selected using, for example, a join-shortest-queue algorithm. A stashing virtual channel column buffer is then selected using, again, a join-shortest-queue algorithm, and the packet competes with other traffic for use of the column bus. Once the packet reaches the stash partition at a destination port, a location message including the buffer index may be communicated back to the port where the packet copy originated. The location message may be stored in the originating port's packet management data structure along with other relevant metadata for tracking the original packet. Side-band communication may be utilized between the originating and destination ports to exchange various bookkeeping messages such as location messages. These messages may comprise metadata including location indices, port numbers, and commands such as delete or retransmit.

When a packet reaches its final network destination, a packet received acknowledgment is returned. The packet received acknowledgment is typically returned with minimal latency independent of higher-level network protocols and thus does not introduce additional protocol deadlock conditions or delays. When the originating port receives the packet received acknowledgment it retrieves the memory address of the stashed packet from the stash partition management data structure. If the packet received acknowledgment is positive, stash partition management logic deletes the stashed packet, freeing up space in the stash partition. If the packet received acknowledgment is negative, indicating an error, the stash partition management logic performs an end-to-end retransmission of the stashed packet (for example, up to some configured limit of retries).

Support for packet order enforcement is important for inherently unordered networks such as the dragonfly network because programming models sometimes require strict order. For example, completion of a large buffer transfer, such as a halo exchange, is usually indicated by a flag which must strictly follow all of the data. In lieu of one-at-a-time sends, hardware can dramatically accelerate ordered transfers by providing reordering buffers at the destinations. However, such buffers are a limited resource and may result in dropped packets when they are exhausted. End-to-end retransmission provides recovery, simplifying the implementation of an ordering protocol and allowing for flexible solutions.

In another embodiment, the unconventional switching architecture 400 may be utilized to implement a congestion handling protocol (e.g., ECN). A congestion handling protocol is a communication protocol for mitigating or avoiding congestive conditions in a data network resulting from oversubscription. Congestion control is often accomplished by first detecting congestive conditions, and in response, throttling the rate at which packets are introduced into the network. Congestion control thus prevents or slows all senders to the network from overwhelming the network and causing head-of-line blocking in network queues, where head-of-line blocking is a performance-limiting phenomenon that occurs when communication of a sequence of packets is held up by delays in communicating the first packet in the sequence. Examples of congestion handling protocols include ECN, Speculative Reservation Protocol, Last-Hop Reservation Protocol, TCP/IP, Active Queue Management, and Random Early Detection.

The use of the stash partitions improves congestion handling protocols by temporarily absorbing congestion-forming packets while the congestion handling protocol is in the process of responding. This temporary absorption shields other network traffic from transient effects and provides extra time for the congestion handling protocol feedback and source throttling mechanism to respond. Herein, "throttling mechanism" refers to a technique for slowing down the rate at which packets enter a network or switch, typically utilized to manage congestion in the network or switch. Many throttling mechanisms are known in the art, from naïve packet dropping to complex traffic shaping algorithms. The performance of the network during congestion is thus improved.

In one embodiment of the ECN congestion handling protocol, each endpoint in the network maintains a separate transmission window for every endpoint it communicates with and can only transmit to an endpoint if space is available in the destination endpoint's dedicated transmission window. When a source injects a packet into the network, the packet's size (in flits) is added to the destination's transmission window. When the source later receives a positive packet received acknowledgment, the packet's size is deducted from the transmission window. The size of each transmission window is initially set to a maximum value (e.g., 4096) of flits, set to enable an endpoint to stream traffic to any destination endpoint at full bandwidth. Congestion detection is performed by monitoring the occupancy of switch input buffers. When a buffer's occupancy exceeds a configured threshold of its capacity (e.g., 50%), the input port enters a congested state and begins to set the ECN bit of any packet passing through it towards a destination. At a destination, the ECN bit is copied from the packet to the packet received acknowledgment and returned to the source. Every packet received acknowledgment received with the ECN bit set causes the source to reduce the size of the transmission window for the destination to a configured percentage of the current size (e.g., 80%). To recover from congestion, each transmission window has a timer which causes it to increase its size by one flit every configured number of cycles (e.g., 30) until reaching the initial transmission window maximum size.

When an input port is in a congested state it opportunistically communicates packets destined for endpoints to stash partitions in addition to the conventional packet processing behavior. Stashing occurs when four conditions are satisfied: 1) the packet is at the head of a congested input port, 2) the packet is at the last switch before the destination endpoint, 3) the packet cannot advance on its conventional virtual channel through the crossbar switch (i.e., the packet is blocked due to congestion and lack of credits), and 4) the packet can advance over the stash partition storage virtual channel.

As previously noted, selecting a data path to a stash partition may involve applying the join-shortest-queue algorithm. When a congested packet reaches a stash partition it may be stored and accessed from the stash partition in first-in-first out (FIFO) order. Packets in the stash partition contend for their intended output ports through the crossbar switch over the stashing retrieval virtual channel. Packets traveling to and from the stash partitions use separate storage and retrieval virtual channels and congestion created by them does not result in head-of-line blocking on packets on conventional virtual channels in the crossbar switch. The number of congested packets stored in a port's stash partition is not included in the normal ECN calculation for that port. Stashing blocked packets from a congested input port alleviates head-of-line blocking effects on that input port. Any uncongested traffic that shares an input port with a congested traffic flow is enabled to make more forward progress compared to what occurs in conventional crossbar switches. The limited number of stash partitions on a single switch means that congested input ports will eventually be unable to stash packets and head-of-line blocking will eventually happen. Stashing congested packets is a temporary measure that provides more time for the ECN handling mechanisms to throttle the congestion at its source. Once ECN handling mechanisms take effect, the affected input ports exit the congested state and packet stashing ceases.

Examples of other congestion handling protocols that may be used for detecting congestion and throttling problematic senders include Speculative Reservation Protocol and Last-Hop Reservation Protocol. A common feature of these protocols is that messages causing congestion are dropped and then scheduled for retransmission at a reduced pace. Stashing allows the throttling and retransmission mechanisms to be implemented in the first-hop switches, including storage of the speculative packets.

Although discussed in the context of a dragonfly network these stashing techniques are applicable to other topologies such as multi-level fat-trees, fat-flys, Benes, Clos, meshes, and tori.

Figure 6:
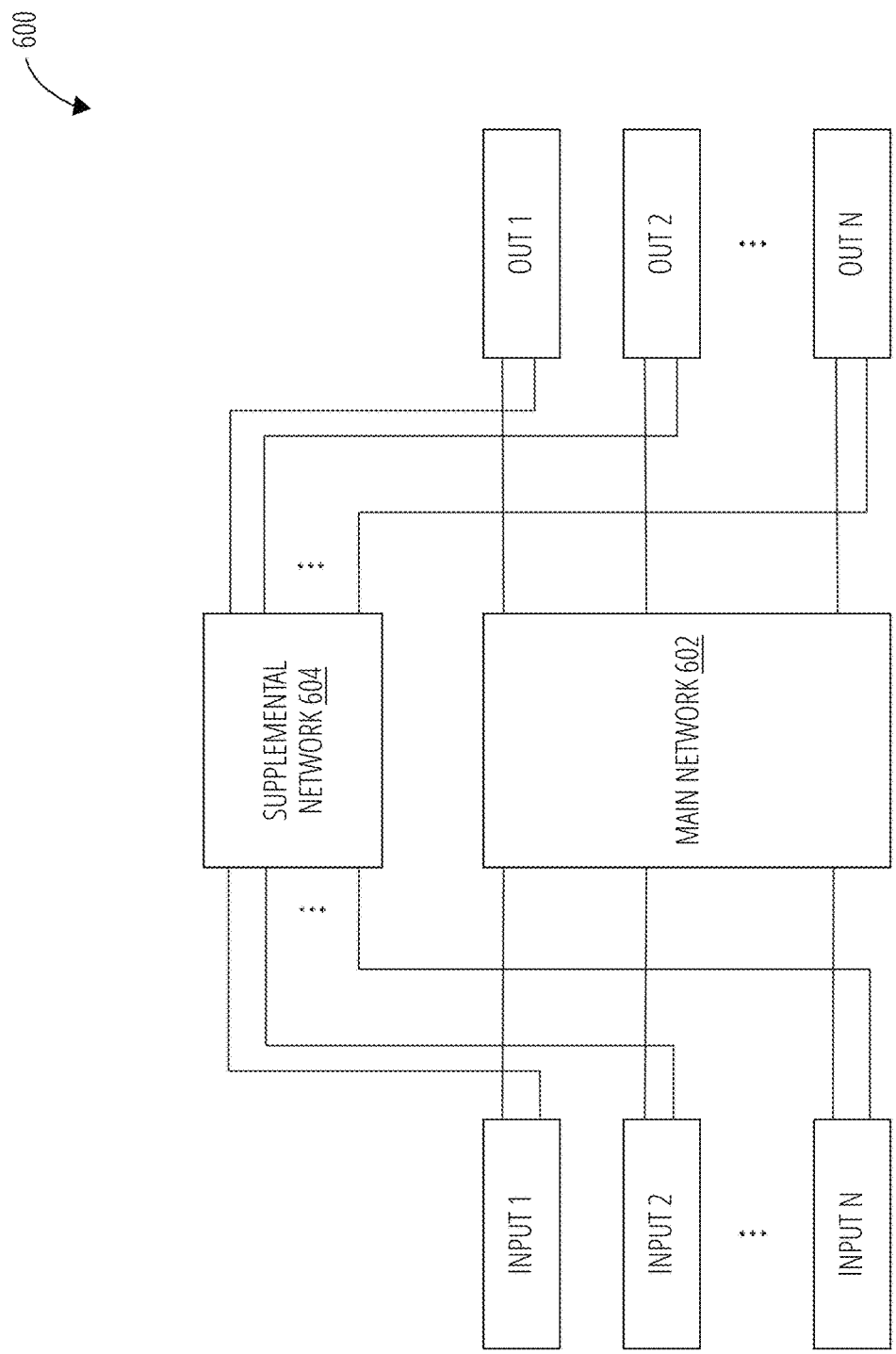
FIG. 6 depicts a switch with supplemental network 600 in accordance with one embodiment.

FIG. 6 depicts a switch with supplemental network 600 in accordance with one embodiment. The main network 602 may comprise a tiled switch or other switch architecture, for example with N input ports and N output ports. The main network 602 may utilize a crossbar switch 300 or other conventional architecture. Rather than using virtual channels to implement the stashing buffer solution, however, a supplemental network 604 may be implemented, as a separate physical switching fabric dedicated to storing and routing stashed packets. This may result in higher performance and reduced complexity of the main network 602. It is also a solution that may be readily added to existing conventional switching systems.

"Logic" refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A crossbar switch comprising:
   a plurality of input ports;
   a plurality of output ports;
   a switching fabric interposed between the input ports to the output ports; and
   a plurality of stash partitions in a packet recirculating data path through the switching fabric, the recirculating data path bypassing the input ports and the output ports, the stash partitions allocated from port buffer memory.

2. The crossbar switch of claim 1, the packet recirculating data path comprising storage virtual channels coupling inputs of the switching fabric to the stash partitions and retrieval virtual channels coupling the stash partitions to outputs of the switching fabric.

3. The crossbar switch of claim 2, both of the storage virtual channels and the retrieval virtual channels traversing the switching fabric of the crossbar switch.

4. The crossbar switch of claim 1, further comprising logic to route the packets from the input ports to the stash partitions based on a join-shortest-queue algorithm.

5. The crossbar switch of claim 1, wherein the stash partitions are implemented using two or more banks of dual-ported memory.

6. The crossbar switch of claim 1, comprising logic to manage the stash partitions using a heap algorithm.

7. A switch comprising:
a first switch fabric coupling a plurality of packet sources to a plurality of packet destinations; and
a second switch fabric also coupling the plurality of packet sources to the plurality of packet destinations; and
a plurality of stash partitions coupled to the first switch fabric and to the second switch fabric, the stash partitions forming a stash storage pool from both of input buffers and output buffers of the switch; and
wherein packets that pass from the packet sources to the packet destinations through the second switch fabric are stored in the stash partitions and are recirculated internally in the switch from the stash partitions to the packet destinations through the first switch fabric.

8. The switch of claim 7, comprising logic to manage the stash partitions using a heap algorithm.

9. A crossbar switch comprising:
a plurality of input ports;
a plurality of output ports;
a switch fabric coupled to the plurality of input ports and to the plurality of output ports;
a buffer memory coupled to one of the plurality of input ports and the plurality of output ports and including:
a first memory portion allocated as a buffer partition, and
a second memory portion allocated as a stash partition for recirculating packets through the switching fabric while bypassing the input ports and output ports; and
logic coupled to the buffer memory for controlling allocation of the buffer partition and the stash partition.

* * * * *